(12) United States Patent
Takahashi et al.

(10) Patent No.: US 7,087,854 B2
(45) Date of Patent: Aug. 8, 2006

(54) SPOT WELDING APPARATUS

(75) Inventors: Kuniaki Takahashi, Tokyo (JP); Kenei Shin, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/046,605

(22) Filed: Jan. 28, 2005

(65) Prior Publication Data

US 2005/0167402 A1    Aug. 4, 2005

(30) Foreign Application Priority Data

Jan. 29, 2004    (JP)    ............................. 2004-021718

(51) Int. Cl.
*B23K 11/10*    (2006.01)
(52) U.S. Cl. .................................. 219/91.22
(58) Field of Classification Search ............. 219/91.21, 219/91.22, 617
See application file for complete search history.

(56) References Cited

U.S. PATENT DOCUMENTS

| | | | | | |
|---|---|---|---|---|---|
| 2,205,425 | A | * | 6/1940 | Leonard Jr. | 219/608 |
| 3,592,998 | A | * | 7/1971 | Derclaye | 219/91.22 |
| 3,659,074 | A | * | 4/1972 | Friess | 219/91.22 |
| 4,804,819 | A | * | 2/1989 | Farrow | 219/91.2 |
| 6,265,701 | B1 | * | 7/2001 | Bickel et al. | 219/617 |

* cited by examiner

*Primary Examiner*—Clifford C. Shaw
(74) *Attorney, Agent, or Firm*—Smith, Gambrell & Russell

(57) ABSTRACT

A spot welding apparatus for spot welding superposed workpieces by putting the superposed workpieces 3, 4 between a pair of electrodes 1, 2 and applying a welding current between the electrodes under application of pressure, the apparatus having heating coils 15 wound on each of the electrodes 1, 2, and being provided with high frequency heating means 17 for induction-heating welding portions of the workpieces contacted by the electrodes. The spot welding apparatus is capable of firmly spot welding workpieces made of high tension steel even if there is opening between the workpieces.

6 Claims, 2 Drawing Sheets

SPOT WELDING APPARATUS

CROSS REFERENCE TO RELATED APPLICATIONS AND INCORPORATION BY REFERENCE

This application based upon and claims the benefit of priority from the prior Japanese Patent Application No. 2004-021718, filed on Jan. 29, 2004; the entire content of which is incorporated herein by reference.

BACKGROUND OF THE INVENTION

1. Field of the Invention

The present invention relates an apparatus for spot welding superposed workpieces by putting the superposed workpieces between a pair of electrodes and applying a welding current between the electrodes under application of pressure.

2. Description of the Related Art

In a spot welding apparatus, the superposed workpieces are put between edges of a pair of electrodes and pressed between the electrodes under application of a welding current (electric current) whereby the superposed workpieces are spot welded. In case material of the workpieces is apt to be deformed by the application of pressure between the electrodes 55, 56, two workpieces 51, 52 can be contacted each other by deforming them as shown in FIG. 3(b) even if there is opening 53 between the two work-pieces 51, 52 owing to variability of the dimension precision of their materials. Therefore the two workpieces 51, 52 can be firmly spot welded with forming a nugget 58 at the welding portions.

In a spot welding apparatus used in production line of vehicles, a high-tension steel having high strength is frequently used as materials of vehicles with increase of requirement making them lightweight and high strength in recent years. However, the application of pressure by the electrodes does not bring about sufficient deformation of workpieces made of the high-tension steel, and therefore it becomes difficult that the two work-pieces are firmly spot welded when an opening is produced between the two workpieces of the high-tension steel.

JA2002-961178 discloses a spot welding apparatus in which spot welding is carried out with taking the opening between the two workpieces into consideration. In the spot welding apparatus, the two workpieces are put between a pair of electrodes under application of pressure, and welding current is applied between the electrodes under the application of pressure for a short time to preheat the workpieces so as to be intimate with each other, and then the workpieces are spot welded each other with controlling the welding current such that calorific value of the workpieces reaches a predetermined value within a predetermined period time for applying the current.

SUMMARY OF THE INVENTION

In the spot welding apparatus of the above-mentioned publication, however, the preheating of the workpieces is carried out by application of the welding current, and consequently there are some cases where the workpieces cannot be contacted each other in the portions which should be welded under application of pressure by the electrodes when the welding current for the preheating flows far from the welding portions (portions to be welded) owing to existence of opening between the workpieces. Such a phenomena generally appear in cases that the opening between the work-pieces to be welded is large or that the workpieces are the high tension steel plates mentioned previously.

Thus, the spot welding apparatus disclosed in the above-mentioned publication does not occasionally bring about attainment of the expected results to reduce reliability of the spot welding.

In view of the above-mentioned problems, the object of the present invention is to provide a reliable spot welding apparatus being capable of firmly spot welding workpieces made of high tension steel even if there is opening between the workpieces.

The present invention to attain the object is provided by a spot welding apparatus for spot welding superposed workpieces by putting the superposed workpieces between a pair of electrodes and applying a welding current between the electrodes under application of pressure, the apparatus having heating coils wound on each of the electrodes, and being provided with high frequency heating means for induction-heating welding portions of the workpieces contacted by the electrodes.

The preferred embodiment (1) of the invention is provided by the spot welding apparatus being further provided with:

welding current detecting means for detecting the welding current, and heat control means for controlling operation of the high frequency heating means based on a value of the welding current detected by the welding current detecting means.

The preferred embodiment (2) is provided by the spot welding apparatus of the embodiment (1), wherein the heat control means stops the operation of the high frequency heating means when a value of the welding current exceeds a predetermined standard value, and controls current value and/or frequency of a high frequency current transmitted to the heating coils based on the value of the welding current and type of material of the workpieces when the value of the welding current is not more than a pre-determined standard value.

The preferred embodiment (3) is provided by the spot welding apparatus of the embodiment (1) or (2), being further provided with coil driving means driving each of the heating coils in a direction parallel to a moving direction of a corresponding electrode, and coil drive control means controlling drive of the heating coils by the coil driving means based on the value of the welding current.

The preferred embodiment (4) is provided by the spot welding apparatus of the embodiment (3), wherein the coil drive control means moves each of the heating coils to a predetermined position to a rear of the work-pieces when the value of the welding current exceeds a predetermined standard value, and moves each of the heating coils to a predetermined heating position in the vicinity of the workpieces when the value of the welding current is not more than a predetermined standard value.

The preferred embodiment (5) is provided by the spot welding apparatus of the invention or the embodiment (1), wherein each of the heating coils is provided to move together with the corresponding electrode.

Effect of the invention is described as follows:

According to the present invention, the portions of the workpieces to be welded with which each of the electrodes is brought into contact are induction-heated by the high frequency heating means having the heating coil corresponding to each of the electrodes, and therefore, for example, even if opening is generated between the workpieces made of high tension steel, the workpieces can be sufficiently deformed by application of pressure by the electrodes, whereby the workpieces to be welded can brought in contact with each other to be firmly welded. Thus reliability of the spot welding can be improved.

According to the invention of the embodiment (1), the control of operation of the high frequency heating means is carried out based on a value of the welding current, and hence efficiency of the spot welding can be enhanced.

According to the invention of the embodiment (2), the heat operation is not carried out by the high frequency heating means when the value of the welding current exceeds a predetermined standard value, and current value and/or frequency number of a high frequency current transmitted to the heating coil is controlled based on the value of the welding current and type of material of the workpieces when the value of the welding current is not more than a predetermined standard value. Thus, the workpieces can be efficiently heated only in case of requiring heating, whereby the spot welding can be efficiently carried out.

According to the invention of the embodiment (3), each of the heating coils can be driven in a direction parallel to a moving direction of the corresponding electrode, and the driving is controlled based on the value of the welding current. Hence, the welding portions can be heated at an adequate position.

According to the invention of the embodiment (4), each of the heating coils is allowed to move to a predetermined position in a rear of the workpieces when the value of the welding current exceeds a predetermined standard value, and each of the heating coils is allowed to move to a predetermined heating position in the vicinity of the workpieces when the value of the welding current is not more than a predetermined standard value. Hence, the workpieces can be efficiently heated only in case of requiring heating, whereby the spot welding can be efficiently carried out.

According to the invention of the embodiment (5), each of the heating coils is allowed to move together with the corresponding electrode, and hence the constitution of the apparatus can be made simple.

DETAILED DESCRIPTION OF THE INVENTION

Embodiments of the spot welding apparatus according to the present invention are explained by reference of FIGS. 1 and 2 below.

Figure 1:
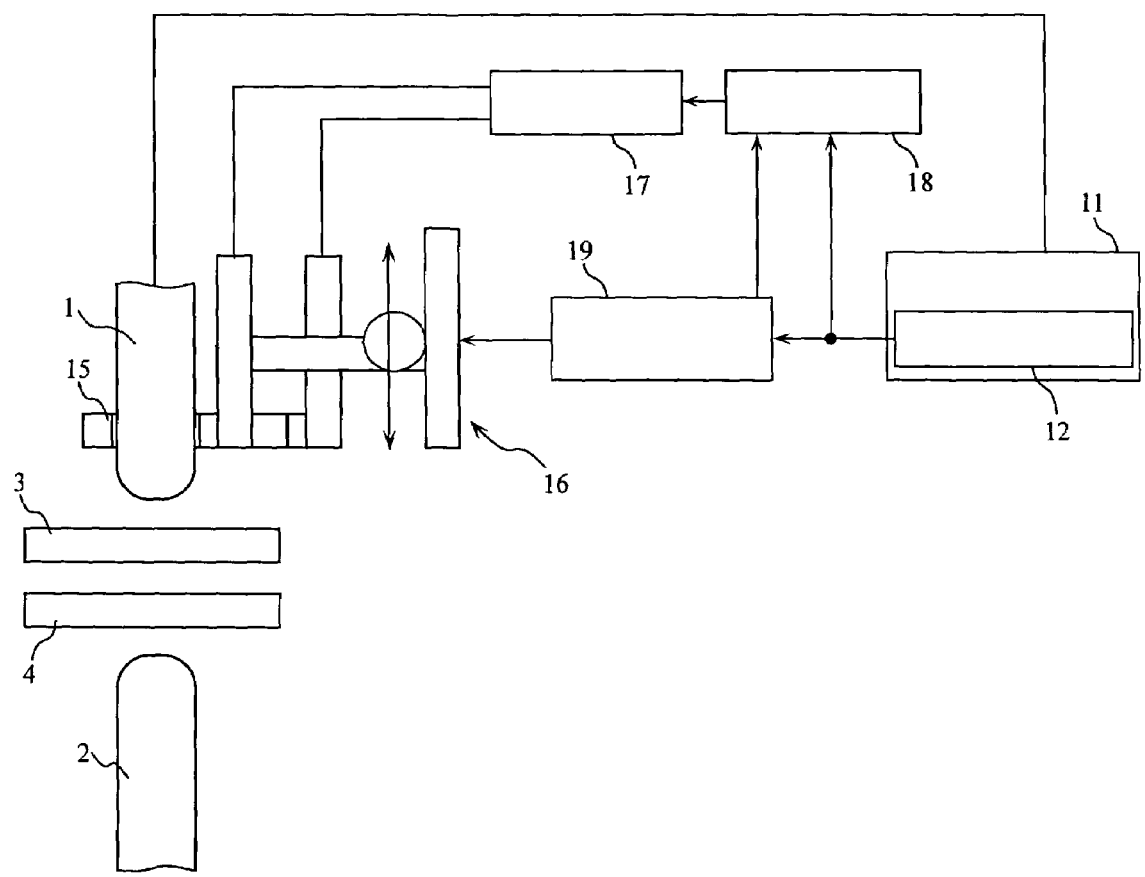
FIG. 1 is a view showing the constitution of a feature of the spot welding apparatus according to the present invention.
Figure 2:
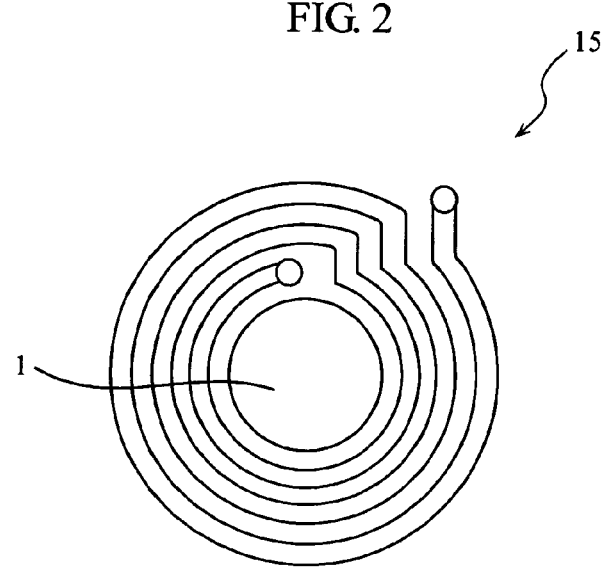
FIG. 2 is a plane view of the heating coil illustrated in FIG. 1.
Figure 3:
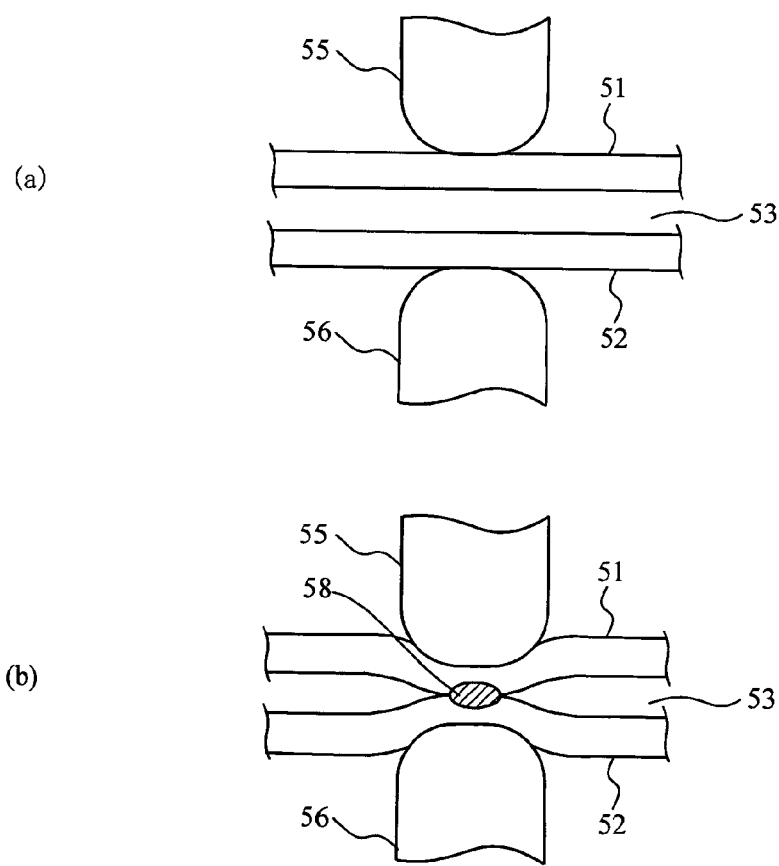
FIG. 3 is a view for explaining conventional technology.

FIG. 1 is a view showing the constitution of a feature of the spot welding apparatus according to the present invention. FIG. 2 is a plane view of the heating coil illustrated in FIG. 1.

In a spot welding apparatus using a servo-gun, a pair of electrodes 1, 2 are driven using a servomotor (not shown) and workpieces 3, 4 are put between the edges of the electrodes 1, 2 under application of pressure, and under this condition, welding current is applied between the electrodes 1, 2 to spot weld the workpieces 3, 4. In the spot welding apparatus according to the embodiment of the invention, the servo-gun control apparatus 11 controlling the drive of the electrodes 1, 2 is provided with a welding current detecting circuit (i.e., welding current detecting means) 12 which detects a welding current flowing between the electrodes 1 and 2.

Further, on the side of the electrode 1, a flat-shaped heating coil (i.e., high frequency heating means) 15 wound on the electrode 1 is disposed, and simultaneously a coil driving mechanism 16 as coil driving means which drives the heating coil 15 in a direction parallel to a moving direction of the electrode 1 independently of the electrode 1 is disposed.

The coil driving mechanism 16 is configured such that the heating coil 15 can be driven, for example, by a known linear driving mechanism such as a rack and pinion system having an encoder-attached motor, and simultaneously the moved position of the heating coil 15 can be detected.

Though not shown in Figures, a heating coil 15 and a coil driving mechanism 16 are also provided on the side of the electrode 2 in the same manner as on the side of the electrode 1.

The heating coils 15, 15 corresponding to the electrodes 1, 2 are connected to a high frequency electric source (i.e., high frequency heating means) 17 in parallel, and the heating coils 15, 15 and the high frequency electric source 17 constitute a high frequency heating means. The drive of the high frequency heating means is controlled by a heating control circuit 18 as heating control means based on a welding current value detected in the welding current detecting circuit 12 and signals showing movement-completion of the heating coils 15, 15 given from the coil driving mechanisms (i.e., coil driving means) 16, 16.

The coil driving mechanisms 16, 16 control the position of the heating coils 15, 15 by driving the coils with monitoring the position by means of a coil drive control circuit 19 as a coil drive control means based on the welding current values detected in the welding current detecting circuit 12. In this embodiment, usually, the heating coils 15, 15 are positioned at the predetermined waiting position far from the workpieces 3, 4.

The operation of the embodiment of the invention is explained below.

The welding portions (portions to be welded) of the workpieces 3, 4 are put between the edges of the electrodes 1 and 2, and welding current is applied between the electrodes 1, 2 under the application of pressure to the workpieces 3, 4 to start the spot welding operation. In the spot welding operation, the welding current flowing between the electrodes 1, 2 is detected by the welding current detecting circuit 12 of the servo-gun control apparatus 11.

In case the welding portions of the workpieces 3, 4 are in contact with each other, the welding current flows between the electrodes through the welding portions, which shows a reduced resistance value due to the short current path, and consequently the value of the welding current detected by the welding current detecting circuit 12 increases. In contrast, in case there is opening between the welding portions of the workpieces 3, 4, the welding current flows between the electrodes through the contact portions of the workpieces 3, 4 far from the welding portions, which shows a increased resistance value due to the long current path, and consequently the value of the welding current detected by the welding current detecting circuit 12 reduces.

In the heating control circuit 18, the value of welding current in the welding current detecting circuit 12 is monitored, and when the welding current value exceeds a predetermined standard value, the operation of the high frequency heating means is stopped not to transmit high frequency current to the heating coils 15, 15 based on the judgment that opening is not present between the workpieces 3, 4 and the workpieces 3, 4 are in closely contact with each other.

Similarly, in the coil drive control circuit 19, the value of welding current in the welding current detecting circuit 12 is monitored, and when the welding current value exceeds a predetermined standard value, the operation of the coil driving mechanisms 16, 16 is stopped to keep the heating coils 15, 15 at the predetermined waiting position far from the workpieces 3, 4 whereby the ordinary welding operation is carried out.

In contrast, when the welding current value in the welding current detecting circuit 12 is not more than a predetermined standard value, the operation of the coil driving mechanisms 16, 16 is first started by the coil drive control circuit 19 based on the judgment that opening is present between the workpieces 3, 4, and the heating coils 15, 15 is moved to the predetermined heating position near to the workpieces 3, 4 to transmit signals showing completion of the moving (movement completion signals) to the heating control circuit 18.

Thereafter, the heating control circuit 18 receives the movement completion signals from the coil drive control circuit 19 to transmit high frequency current to the heating coils 15, 15, whereby the welding portions of the workpieces 3, 4 contacted by the electrodes 1, 2 are induction-heated. In the case, the current value and/or frequency of the high frequency current heating means transmitted to the heating coils 15, 15 are controlled based on the value of the welding current in the welding current detecting circuit 12 and type of material of the workpieces.

Thereafter, when the welding current value in the welding current detecting circuit 12 exceeds a predetermined standard value, the heating control circuit 18 stops to transmit high frequency current to the heating coils 15, 15 whereby the operation of the high frequency heating means is stopped and simultaneously the coil driving mechanisms 16, 16 is driven by the coil drive control circuit 19 to move the heating coils 15, 15 at the predetermined waiting position far from the workpieces 3, 4.

As the embodiment of the invention, for example, in case heat quantity introduced for heating by the use of the heating coil 15 for a short time period is 4,000 J/sec., the efficiency is 72%, the workpieces are made of iron (specific heat: 0.64 J/g·K), the welding portions weight 10 g, the room temperature is 25° C., and the workpieces will deform at 100° C. by the application of pressure by the electrodes; heat quantity requiring for the deformation of the workpieces is [10 g×(400° C.−25° C.)×0.64=] 2,400 J. On the other hand, the heat quantity introduced into the workpieces by the is heating coil 15 is [4,000×0.72=] 2,880 J/sec. and therefore the heating time period by the heating coil 15 is [2,400/2,880=] 0.83 sec.

That is, in case there is opening between the workpieces 3, 4 in their welding portions, the workpieces are heated by the heating coils 15 only for 0.83 sec. early in the beginning of the welding, whereby the work-pieces 3, 4 are firmly spot welded.

According to the embodiment of the invention, as mentioned above, when the welding current is detected and the detected welding current value is not more than the predetermined current value, the heating coils 15, 15 are moved to the predetermined heating position near to the workpieces 3, 4 to induction-heat the welding portions of the workpieces 3, 4 contacted by the electrodes 1, 2 based on the welding current value and the type of material of the workpieces 3, 4. Therefore, even if the workpieces 3, 4 are high tension steel having high strength and have opening therebetween, it is possible to deform the workpieces 3, 4 by the application of pressure using the electrodes 1, 2 to contact the workpieces 3, 4 each other. Thus, the welding portions can be efficiently and firmly spot welded whereby reliability of the spot welding can be enhanced.

While the presently preferred embodiments of the present invention lo have been shown and described, it is to be understood that disclosures are for the purpose of illustration and that various changes and modification may be made without departing from the scope of the invention as set forth in the appended claims.

In the embodiment of the invention, for instance, the welding current is detected, and based on a value of the detected welding, it is judged that there is opening between the workpieces in the their welding portions or not, and then when the opening is present, the induction-heating of the welding portions is carried out. However, it can be also carried out as follows: a lot of openings between workpieces are beforehand measured and the obtained data are saved in a data-base together with welding point numbers, and when the workpieces having the welding point number showing existence of opening in the welding portions is welded, the welding portions are induction-welded.

Further, the heating coils 15, 15 are movable together with the corresponding electrodes 1, 2 in one body, whereby it is possible to dispense with the coil driving mechanisms 16, 16 and the coil drive control circuit 19. Thus the constitution of the apparatus can be simplified.

What is claimed is:

1. A spot welding apparatus for spot welding superposed workpieces by putting the superposed workpieces between a pair of electrodes and applying a welding current between the electrodes under application of pressure, the apparatus having heating coils wound on each of the electrodes, and being provided with high frequency heating means for induction-heating welding portions of the workpieces contacted by the electrodes, and further comprising:

welding current detecting means for detecting the welding current, and heat control means for controlling operation of the high frequency heating means based on a value of the welding current detected by the welding current detecting means.

2. A spot welding apparatus as defined in claim 1, wherein the heat control means stops the operation of the high frequency heating means when a value of the welding current exceeds a predetermined standard value, and controls current value and/or frequency of a high frequency current transmitted to the heating coils based on the value of the welding current and type of material of the workpieces when the value of the welding current is not more than a predetermined standard value.

3. A spot welding apparatus as defined in claim 2, further comprising coil driving means driving each of the heating coils in a direction parallel to a moving direction of a corresponding electrode, and coil drive control means controlling drive of the heating coils by the coil driving means based on the value of the welding current.

4. A spot welding apparatus as defined in claim 1, wherein each of the heating coils is provided to move together with the corresponding electrode.

5. A spot welding apparatus for spot welding superposed workpieces by putting the superposed workpieces between a pair of electrodes and applying a welding current between the electrodes under application of pressure, the apparatus having heating coils wound on each of the electrodes, and being provided with high frequency heating means for induction-heating welding portions of the workpieces contacted by the electrodes, which further comprises:

welding current detecting means for detecting the welding current, heat control means for controlling operation of the high frequency heating means based on a value of the welding current detected by the welding current detecting means, the heat control means stopping the operation of the high frequency heating means when a value of the welding current exceeds a predetermined standard value, and controlling current value and/or frequency of a high frequency current transmitted to the heating coils based on the value of the welding current and type of material of the workpieces when the value of the welding current is not more than a predetermined standard value, and coil driving means driving each of the heating coils in a direction parallel to a moving direction of a corresponding electrode, and coil drive control means controlling drive of the heating coils by the coil driving means based on the value of the welding current.

6. A spot welding apparatus as defined in claim 5, wherein the coil drive control means moves each of the heating coils to a predetermined position to a rear of the workpieces when the value of the welding current exceeds a predetermined standard value, and moves each of the heating coils to a predetermined heating position in the vicinity of the workpieces when the value of the welding current is not more than a predetermined standard value.

* * * * *